May 4, 1948.    J. BOURDEAUX    2,440,818
DRIVE CHAIN
Filed Dec. 1, 1945    2 Sheets-Sheet 1

INVENTOR
JOHN BOURDEAUX
Ernest H. Carver
ATTORNEY

May 4, 1948.  J. BOURDEAUX  2,440,818
DRIVE CHAIN
Filed Dec. 1, 1945  2 Sheets-Sheet 2

INVENTOR
JOHN BOURDEAUX
ATTORNEY

Patented May 4, 1948

2,440,818

Search Room

UNITED STATES PATENT OFFICE 2,440,818

DRIVE CHAIN

John Bourdeaux, Vancouver, British Columbia, Canada

Application December 1, 1945, Serial No. 632,224

6 Claims. (Cl. 74—250)

My invention relates to improvements in drive chains, which are adapted for use as conveyor chains, power transmitting chains and chain cutting devices such as falling and bucking saws, or any type of wood or metal cutting endless chain saws.

The objects of the invention are to provide a saw in which the strain bearing links all lie in a single plane and in which the rolling contact between one link and another shall be in direct alignment with the pull of the chain and along the axis of the load. A further object is to provide a large bearing area as between each pair of links and to provide a chain having a single line of connecting links and chain rollers on both sides of the single row of links, as will be more fully described in the following specification and shown in the accompanying drawings, in which—

In the drawings like characters of reference indicate corresponding parts in each figure.

Figure 1:
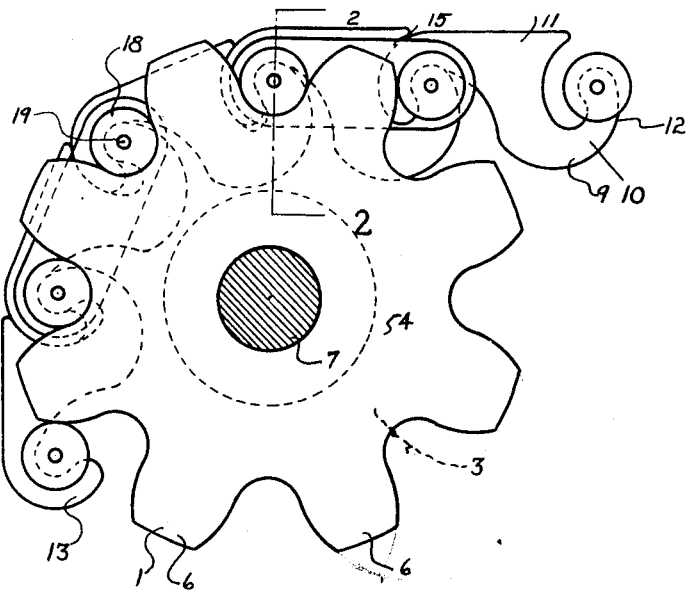
Fig. 1 is a side view of the chain in its simplest form, passing over a chain sprocket.
Figure 3:
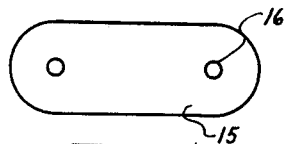
Fig. 3 is a side view of one of the washers.
Figure 4:
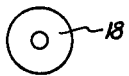
Fig. 4 is a side view of a chain roller.
Figure 2:
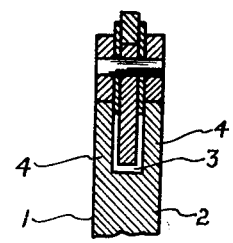
Fig. 2 is a transverse sectional view taken on the line 2—2 of Figure 1.
Figure 5:
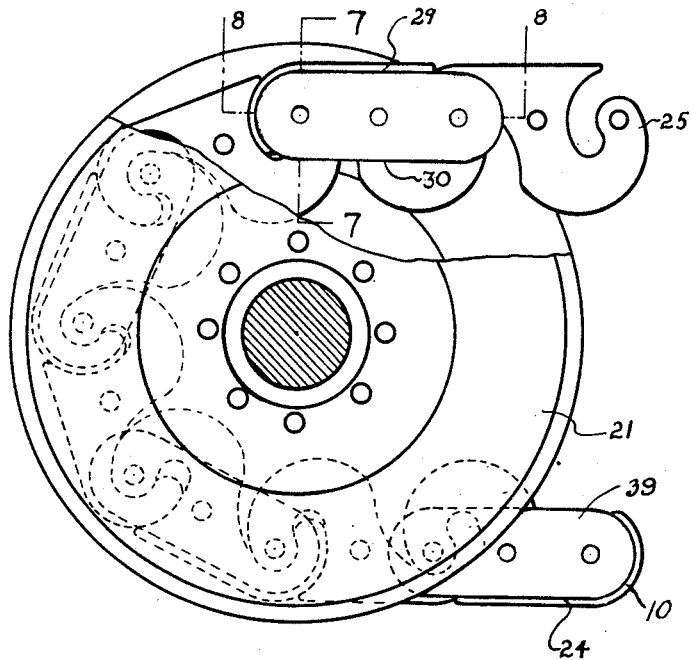
Fig. 5 is a side view of a modification, adapted to run on V-belt pulleys.
Figure 6:
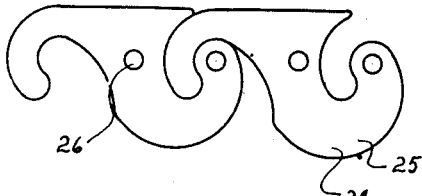
Fig. 6 is a side view showing links only of the chain.
Figure 7:
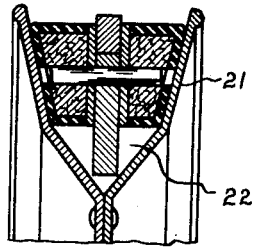
Fig. 7 is a transverse sectional view taken on the line 7—7 of Figure 5.

The numeral 1, see Figures 1 and 2, indicates a sprocket formed with a disk 2 having a peripheral groove 3 defined between sides 4, both of which are provided with sprocket teeth 6. These teeth are arranged in pairs, one tooth of each pair being on opposite sides of the disk 2. The sprocket 1 is obviously mounted upon a shaft 7 to which it is either secured or journalled as the circumstances of the device demand.

A chain 9 is formed of links 10 of sheet material, each of which is identical in form and consists of a centre portion 11 having an eyed head 12 at one end and an encircling hook 13 at its opposite end. The head 12 of one link is adapted to be contained in rocking engagement with the bight of an adjacent encircling hook of the adjoining link. The bight of each link is circumferentially larger than the eyed head of its mating link so as to permit said eyed head to rock sufficiently within the encircling hook of the next link as the links assume their angular position on approaching the sprocket. An elongated washer 15 is preferably applied to opposite sides of each pair of links 10. These washers are apertured as at 16 adjacent each end and each aperture is adapted to register with the eye of adjacent heads 12. The washers are wider than the heads 12 so as to embrace the head and its connecting hook to prevent disalignment of the links. A roller 18 is fitted on each side of every link of the chain with a pin 19 which passes through the rollers, a pair of washers 15 and the eyed head of each link, the rollers obviously serving to engage the sprocket between the teeth 6 and the washers serving to prevent side wear between rollers and link parts.

The chain as thus far described is adapted for use as a drive chain as between one sprocket and another. If the chain were intended for use as a conveyor chain appropriate cross members would be attached to the outer edge of some of the links 10.

Figure 8:
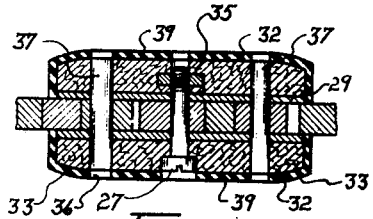
Fig. 8 is a longitudinal sectional view taken on the line 8—8 of Figure 5.

In the modification shown in Figures 5 to 8, the chain is intended to be used as a belt and fitted to a pulley 21 having a V-groove 22. The chain here indicated by the numeral 24 is made up of links 25 which are similar in form with the links 10 hereinbefore described, except that the links 25 are provided with a central aperture 26 through each of which a bolt 27, see Figure 8, is passed. An elongated washer 29 is fitted on opposite sides of each alternate link and is provided with a central aperture 30 through which the bolt 27 extends. Applied on the outside of each washer 29 is a block 32 of fibre or other suitable material which is tapered on its outer sides to conform to the angle of the pulley rim and is rounded off at its ends as at 33. The blocks are apertured intermediate their length to support the bolt 27 and its nut 35, which latter is preferably embedded in the block. Further apertures 36 are provided in the blocks 32 to receive pivot pins 37 which extend through the end of adjacent chain links. Each block 32 is preferably coated as at 39 with rubber or other relatively soft material to provide a gripping surface for engaging the V-groove 22 of the pulley 21.

In this modification, the blocks 32 and their covering form the driving element between the links 25 and the driving wheel or pulley and as each block is substantially one and a third times the link length between pins 37, adequate grip is provided to impart a drive of any desired load.

What I claim as my invention is:

1. A chain adapted to be driven by a drive wheel, said chain comprising a plurality of links each formed of sheet material and having a hook at one end and a head at the opposite end adapted to be fulcrumed within the hook of an adjoining link, means embracing the opposite sides of the complementary hook and head of each link and driving elements for the chain adapted to secure the side embracing members in position upon the links.

2. A chain adapted to be driven by a drive wheel, said chain comprising a plurality of links each formed of sheet material and having a hook at one end and an eyed head at the opposite end adapted to be fulcrumed within the hook of an adjoining link, a pair of members embracing the sides of the connected link members, a pin extending through the members and the eye of the head and driving elements for the chain adapted to secure the side embracing members in position.

3. A chain comprising a plurality of links each formed of sheet material and having a hook at one end and a head at the other adapted to be fulcrumed in the hook of an adjoining link, a pin extending through each head and a roller upon each end of the pin.

4. A chain comprising a plurality of links each formed of sheet material and having a hook at one end and a head at the other adapted to be fulcrumed in the hook of an adjoining link, a pin extending through each head and a roller upon each end of the pin, said roller being of greater diameter than the head of the link.

5. A chain comprising a plurality of links each formed of sheet material and having a hook at one end and a head at the opposite end, the head being adapted to be fulcrumed in the hook of an adjoining link, a washer mounted on opposite sides of some of the links, a pin extending through each pair of washers and through the complementary heads and hooks of adjoining links and means secured to the washers forming a driving member for the chain.

6. A chain comprising a plurality of links each formed of sheet material and having a hook at one end and a head at the opposite end, the head being adapted to be fulcrumed in the hook of an adjoining link, a washer mounted on opposite sides of some of the links, a pin extending through each pair of washers and through the complementary heads and hooks of adjoining links and means secured to the washers forming a driving member for the chain, said driving member means being secured to the washers by a bolt extending through said washers and a link of the chain.

JOHN BOURDEAUX.

REFERENCES CITED

The following references are of record in the file of this patent:

UNITED STATES PATENTS

| Number | Name | Date |
| --- | --- | --- |
| 1,151,587 | Hess | Aug. 31, 1915 |
| 1,842,521 | Goble | Jan. 26, 1932 |